Patented Dec. 15, 1936

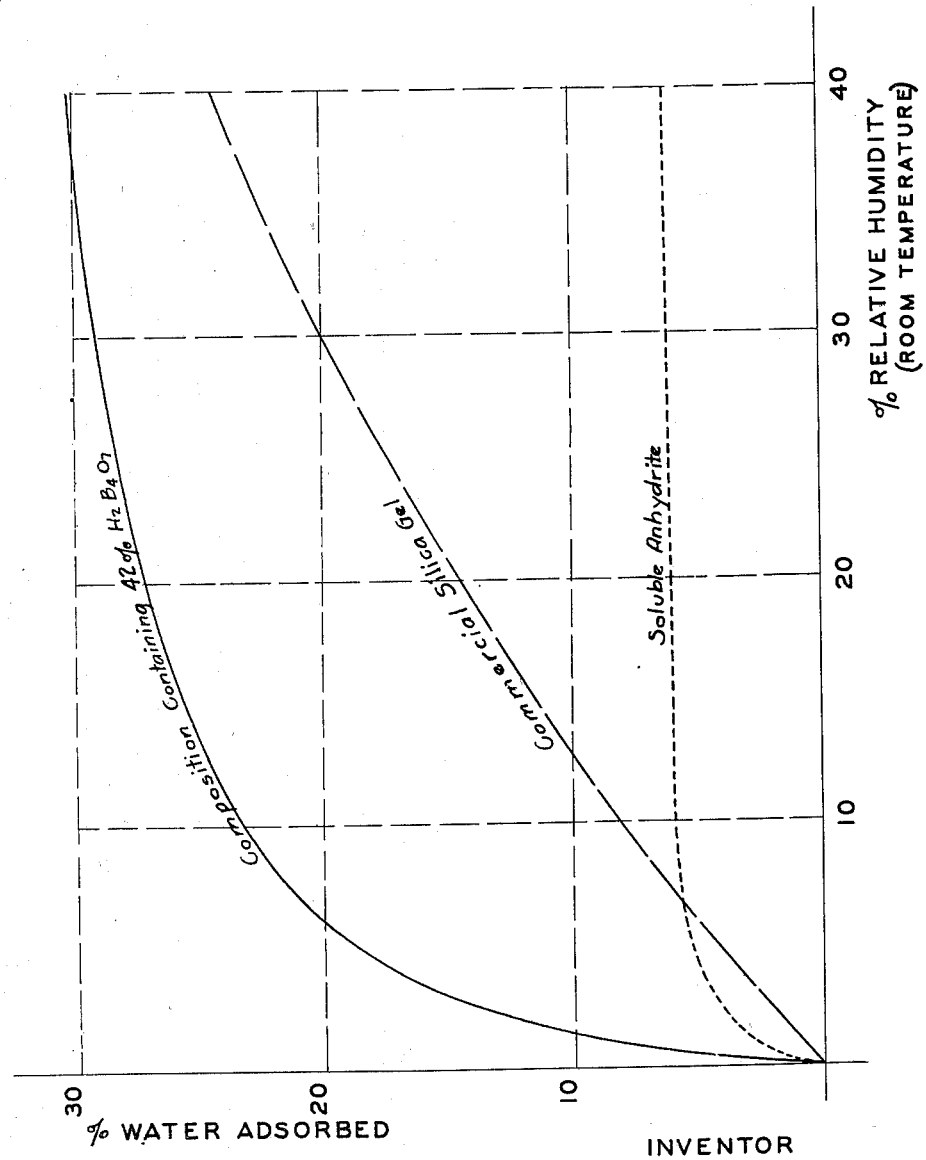

2,064,113

UNITED STATES PATENT OFFICE 2,064,113

MOLDED DESICCANT AND METHOD OF PRODUCING SAME

Ralph V. Heuser, Mount Vernon, N. Y.

Application February 11, 1936, Serial No. 63,465

10 Claims. (Cl. 252—2.5)

This invention relates to desiccants embodying a molded composition of high adsorptive characteristics.

The desiccant in the present case comprises two essential elements, namely a desiccating agent and an inert carrier. The desiccating agent used in this composition has not been employed for drying purposes heretofore, neither singly nor in combination with a carrier, so far as the applicant is aware. Applicant has found that excellent results may be obtained with this drying agent when used in combination with a suitable carrier. This combination constitutes a marked improvement over composite desiccants used heretofore.

The desiccant covered in this invention is applicable to all purposes in which the usual drying agents known in the prior art have been used, such as calcined calcium chloride, phosphorous pentoxide, concentrated sulphuric acid, magnesium perchlorate, activated alumina, silica gel, etc., but it is also particularly well adapted to the use in gas masks and in the desiccating device described in my copending U. S. application for Letters Patent, Ser. No. 5,195, (1935).

In the device described in said application, the adsorbent plates consist of a molded desiccant composition capable of reactivation by heating. These plates are positioned edgewise in one section of the apparatus, in such manner as to set up convection currents and a directionally controlled flow of dry air through the drying compartment, thereby causing objects placed within the same to be dried rapidly.

As a result of further experimental work, the applicant has succeeded in improving the quality of the adsorbent plates to an appreciable extent. The improvement resides in a marked augmentation of sorptive power as well as sorptive capacity of the plates. The molding of the plates has been rendered a simple operation and the cost of producing the plates is much lower.

The method of fabricating plates or other molded bodies according to the present invention consists in compounding commercial ortho-boric acid, $H_3BO_3$, with a specially prepared quality of coarse-pored, precipitated silica and a minor quantity of a fibrous, siliceous material, such as asbestos, mineral wool, glass wool, or the like. In this composition the mixture of precipitated silica and fibrous material constitutes the carrier of the desiccant, while the activity of the desiccating agent is acquired by heating the boric acid contained in this mixture to a temperature of approximately 200° C.

It is known that boric acid, on being heated to temperatures above 100° C., loses its constitutional water to a greater or lesser extent and upon calcination at high temperature it is converted to boron oxide, $B_2O_3$. The latter is a potential drying agent, but it is not readily adapted for use in the drying devices under consideration in which heat is employed as a means of re-activation, considering the high temperature required for complete dehydration and attendant difficulties.

For use in the present invention, preferably hydrates intermediate between boron oxide and ortho-boric acid are taken into consideration, particularly the acids known as meta-boric acid and di-hydro-tetra-boric acid (generally connoted as di-boric acid). These acids result by heating ortho-boric acid to comparatively moderate temperatures, that is, a temperature of somewhat less than 200° C. is sufficient under atmospheric pressure, even for the formation of di-boric acid:

$H_3BO_3 \rightleftarrows H_2O + HBO_2$ (meta-boric acid)

$4H_3BO_3 \rightleftarrows 5H_2O + H_2B_4O_7$ (di-boric acid)

If exposed to the atmosphere in a finely divided state, these two acids absorb at ordinary temperature, water vapor from the air with great avidity. Ortho-boric acid is the end product in both cases. Since ortho-boric acid has a vapor pressure of only 2 mm. Hg at 20° C., according to H. Lescoeur, Ann. de Chimie et Physique 19, 42–8 (1890), obviously both acids are very powerful desiccating agents capable of absorbing the moisture from the air at extremely low degrees of relative humidity. The absorptive capacity of meta-boric acid is 40.9 per cent of its weight of water and that of di-boric acid is 57.0 per cent, respectively. The faculty of these acids of absorbing such large quantities of water even at low degrees of humidity suggests their use as efficient desiccating agents merely from theoretical considerations.

From a practical viewpoint, it is also important that the end product is a non-hygroscopic and chemically substantially inert solid which is not deleteriously affected by acid fumes or carbon dioxide. Furthermore, boric acid is known to possess disinfecting properties and this is a desirable point in the use of this desiccant in gas masks. Another favorable factor is that meta- di- and ortho-boric acids are dissociated into ions in presence of water only to a very small extent, consequently all of these three acids are very poor conductors of electricity even when moist.

This permits of using a system of heating by means of resistance wires embedded in the molded desiccant, an arrangement which is very suitable for re-activating the latter in a simple and convenient manner after it has lost its faculty of absorbing more water. The use of bare wires for reactivating the plates in the manner indicated would be impossible in cases where the desiccating agent was of a corrosive and/or conducting nature, as for example with calcium chloride.

The reason why these intermediate hydrates of boron oxide have not been employed heretofore as desiccating agents is probably attributable to their very slow rate of absorbing water unless used in a finely divided condition. By heating orthoboric acid to the temperature required for reactivation, meta- and di-boric acid form viscid, sticky masses which, upon cooling, harden to smooth, glassy bodies. The latter absorb moisture only in their outermost surface since their vitreous texture prevents a penetration or diffusion of the moisture into their interior. While it would be conceivable to increase their capacity for absorbing water by pulverizing the hardened masses after each re-activation step, a more promising solution of the problem was found to consist of distributing the desiccating agent upon a porous, chemically inert, heat-resisting carrier. Numerous different materials were tried out for this purpose, such as asbestos, mineral wool, diatomite, fuller's earth, granulated activated alumina, calcium hydroxide, etc. Since it was important for reasons of efficiency to employ the carrier in as small an amount as possible with reference to the amount of boric acid used, practically all of these materials were useless as carriers for boric acid. Sample slabs made from the various mixtures, after heating to activation temperature, usually exhibited a glassy, semi-impervious texture and poor activity. Diatomite was somewhat superior to the other materials. Slabs made from mixtures of diatomite and boric acid were more porous and showed a higher rate of adsorption of water vapor. However, the activity of these slabs dropped off considerably after repeated re-activations, mostly as a result of the gradual loss of boric acid by volatilization with water vapor. In further experiments it was found that a specially prepared, amorphous, precipitated silica was much superior to diatomite and highly suitable as a carrier for the boric acid. In fact, the use of this specially prepared silica solved the problem involved in the preparation of molded desiccant plates or other bodies containing the lower hydrates of boron oxide as desiccating agent.

In the preparation of these molded products, no binder is required since the desiccating agent itself acts as an efficient bonding agent of the finely divided silica. After activation, the molded plates exhibit a pure white, dull, finely porous surface, and throughout the entire mass the texture is homogeneous and uniformly porous. For general purposes, a small percentage of a fibrous or filamentous filler is incorporated such as asbestos, glass wool, mineral wool, etc. While the addition of the fibrous material is not strictly essential, nevertheless it materially improves the resilience, elasticity and mechanical strength of the pressed products.

For the preparation of the amorphous, precipitated silica, which, as indicated, is found particularly advantageous as a carrier in the production of the molded desiccants, the process may be used which is described in my copending U. S. application Ser. No. 47,815 (1935).

A solution of 18 lbs. of ammonium sulfate dissolved in 150 lbs. of water, is stirred rapidly while a solution of 84.5 lbs. of sodium silicate of 41° Bé. (containing $SiO_2$ and $Na_2O$ in the approximate ratio of 3.2/1), diluted with 60 lbs. of water, is added gradually in the course of 45 to 60 minutes. The precipitation of hydrated silica takes place at ordinary temperature immediately, and as the addition of the sodium silicate solution is continued, a heavy creamy precipitate is formed. The suspension obtained is filtered and washed free from sodium sulfate and ammonia. Since the precipitate tenaciously retains by adsorption a small quantity of alkali, which is not detrimental to some of its uses, the resulting product need not be further purified for some uses. I have found, however, that the desiccant plates show a somewhat higher sorptive capacity and retentiveness for orthoboric acid when the precipitated silica used in the preparation of the plates is freed from the residual alkali by treatment with dilute acid and subsequent washing with water.

The washed filter cake may be dried at comparatively low temperature, preferably at 40 to 70° C., and the dried material is then passed through crushing rolls, a ball mill, or the like, for reducing any agglomerates to the state of a fine powder, that is, to reduce the agglomerates into the initially discrete particles of which they are composed. Usually the particle size of the product ranges from .5 to 5 microns. The particle size of the finished silica and its physical form may be controlled, within certain limits, by the degree of agitation imparted to the reaction mixture during the precipitation. An agitation insuring an effective stirring of the suspension, rather than a violent beating action, promotes the formation of finer particles, while violent agitation tends to promote the formation of particles of larger dimensions and of a more crystalline character.

It has been found also advantageous to employ dispersing agents in small amounts during the precipitation of the amorphous silica by the above procedure.

While this process for the production of amorphous, precipitated silica has been found particularly suitable for a material of the type required in the present invention, the applicant does not wish to limit himself exclusively to the use of the product and method covered in the said copending U. S. application, but he desires to reserve for himself the right to employ as a carrier for the lower hydrates of boron oxide any silica or silicate resembling in effectiveness the quality of silica producible in accordance with the process covered in the copending application. This type of silica is merely cited as an example.

In compounding the materials used in the preparation of molded desiccant bodies according to the present invention, the proportion of the ingredients of the mixture may be varied within comparatively wide limits without affecting the workability and excellence of the fabricated products. The proportioning of the ingredients depends to a great extent on the use intended to be made of the finished products. For example, when it is intended to produce a desiccant of maximum sorptive capacity, a mixture may be employed consisting of two parts of orthoboric acid and one part of precipitated silica. This mixture may be heated considerably higher than necessary for converting the ortho-boric acid to di-boric acid without causing the formation of glazed surfaces and impeding thereby the rate of absorption. A mixture of this composition was found to absorb 27 per cent of its weight of water from the air having a relative humidity of only 9 per cent. The same mixture would absorb approximately 40 per cent of its weight of water in atmosphere semi-charged with water vapor at room temperature. According to requirements, this composition may be used in the form of tablets, granules, spherical bodies, plates, etc.

When used in the form of plates for drying devices of the type described in my copending application Ser. No. 5,195 (1935) it is preferable to employ a mixture containing a larger proportion of the carrier, because it is hereby important that the desiccant shows the highest degree of porosity and absorption rate. In this application it is also important that the desiccant will exhibit the lowest rate of deterioration in often repeated sorptions and re-activations. With larger proportions of silica, this gradual defection in activity is very small because the tex..re of the specially prepared precipitated silica ounteracts the volatilization of the boric acid by water vapor, a faculty which is not exhibited by the other carriers examined.

Example: In the preparation of a desiccant slab, the following mixture was employed:

| | Grams |
|---|---|
| Ortho-boric acid (commercial pure grade) | 28 |
| Precipitated amorphous silica | 42 |
| Asbestos | 5 |
| Water | 10 |

The three solids were first mixed thoroughly by trituration. After adding the water, the trituration and kneading was continued until a substantially homogeneous mixture resulted which was nearly dry to the touch. This mixture was placed in a rectangular steel die and subjected to a pressure estimated to be between 500 and 1000 lbs. per square inch. The pressed slab had a sharp profile and sufficient strength for handling. After heating it gradually to 100° C. and then further at 250° C. for about one hour, the slab was mechanically strong and ready for use. It was allowed to absorb the moisture in quiescent air during 24 hours when its increase of weight was determined at the prevailing temperature and relative humidity. After re-activation at approximately 200° C. for one hour, and noting its loss of weight, the slab was again exposed to the atmosphere. These alternate steps of activating and absorbing were repeated twenty-six times without the slab suffering any mechanical disintegration. On the twenty-sixth day it had absorbed 34 per cent of its weight of water, (in the course of 24 hours) at a temperature of 79° F. and a relative humidity of 77 per cent. The loss of absorptive power of the slab at the end of the 26-cycle was approximately 14 per cent, based on the initial value, the largest drop being observed during the first days of the experiment.

Similar results were obtained with slabs which were re-activated by means of heat supplied by an electric current passed through a resistance wire coil embedded in the slab.

Comparisons of the efficacy of the desiccant covered in this application with that of silica gel showed the great superiority of the former over the entire range, but particularly at low relative humidities where the absorptive power of the former is more than twice that of silica gel.

In the accompanying drawing, constituting a part hereof, there is shown a series of curves indicating the relative efficiencies of a composition made in accordance with the present invention and other commercial desiccants. The efficiency of the desiccant is particularly apparent at low humidities and from the drawing it will be seen that at a humidity of 10%, the composition according to the present invention is capable of adsorbing over 20% of water, which is several times the amount adsorbed by silica gel or anhydrite. Even at the higher humidities, say at 30% or 40%, the present invention shows marked superiority over other products.

What I claim is:

1. A desiccant comprising a hydrated oxide of boron having less $H_2O$ than orthoboric acid intimately associated with a porous inert carrier.

2. A desiccant comprising a hydrated oxide of boron having less $H_2O$ than orthoboric acid intimately associated with a substantial amount of precipitated silica.

3. A desiccant comprising a hydrated oxide of boron having less $H_2O$ than orthoboric acid intimately associated with a substantial amount of precipitated silica and a fibrous silicious material.

4. A desiccant comprising a hydrated oxide of boron having less $H_2O$ than orthoboric acid in finely divided state associated with a porous carrier and molded to form a coherent body.

5. A desiccant comprising a mixture of metaboric acid and diboric acid in finely divided state intimately associated with a porous inert carrier.

6. A desiccant comprising a mixture of metaboric acid and diboric acid in finely divided state intimately associated with a porous inert carrier, the amount and character of which is such as to prevent fusion and glazing of said boric acid compounds.

7. A desiccant comprising a hydrated oxide of boron having less $H_2O$ than orthoboric acid in finely divided state associated with a porous carrier and molded to form a coherent body and having a sorptive capacity at 10% relative humidity of over 20% of $H_2O$.

8. A method of desiccating which comprises providing a molded coherent body of a hydrated oxide of boron having less $H_2O$ than orthoboric acid associated with a porous carrier, placing the same in a closed chamber and introducing into the same articles to be desiccated.

9. A method of desiccating which comprises providing a coherent body of a finely divided hydrated oxide of boron having less $H_2O$ than orthoboric acid associated with a porous carrier, placing the same in a closed chamber and introducing into the same articles to be desiccated.

10. A method of desiccating which comprises providing a coherent body of a hydrated oxide of boron having less $H_2O$ than orthoboric acid associated with a porous inert carrier, placing the same in a closed chamber and introducing into the same articles to be desiccated.

RALPH V. HEUSER.